United States Patent [19]
Padgett et al.

[11] Patent Number: 5,944,115
[45] Date of Patent: Aug. 31, 1999

[54] CULTIVATOR

[76] Inventors: Kenneth John Padgett; Barry Charles Padgett, both of 10 Mile Track, Scottsdale, Tasmania, Australia, 7260

[21] Appl. No.: 08/860,035
[22] PCT Filed: Nov. 24, 1995
[86] PCT No.: PCT/AU95/00777
  § 371 Date: Jun. 10, 1997
  § 102(e) Date: Jun. 10, 1997
[87] PCT Pub. No.: WO96/15655
  PCT Pub. Date: May 30, 1996

[30]   Foreign Application Priority Data
Nov. 24, 1994  [AU]  Australia .............................. PM-9630

[51] Int. Cl.$^6$ .................................................. A01B 33/06
[52] U.S. Cl. ............................................. 172/111; 172/25
[58] Field of Search ..................................... 111/100, 101, 111/115, 116, 117; 172/47, 49, 49.5, 25, 111, 50, 51; 37/403, 466, 903; 175/327, 391, 385, 316

[56]          References Cited

U.S. PATENT DOCUMENTS

| | | | |
|---|---|---|---|
| 1,506,042 | 8/1924 | Bauer . | |
| 2,429,298 | 10/1947 | Savage | 97/43 |
| 2,619,017 | 11/1952 | Stephenson | 172/49.5 X |
| 3,561,540 | 2/1971 | Kaszkurewicz | 172/111 |
| 4,044,839 | 8/1977 | van der Lely | 172/49 |
| 4,051,903 | 10/1977 | van der Lely | 172/47 |
| 4,936,390 | 6/1990 | Anderson et al. | 172/47 X |
| 5,222,563 | 6/1993 | Van Horlick | 172/111 |

FOREIGN PATENT DOCUMENTS

| | | |
|---|---|---|
| 2589977 | 12/1978 | Australia . |
| 0395321 | 10/1990 | European Pat. Off. . |
| 0488466 | 6/1992 | European Pat. Off. . |
| 605940 | 8/1948 | United Kingdom . |

*Primary Examiner*—Thomas B. Will
*Assistant Examiner*—Robert Pezzuto
*Attorney, Agent, or Firm*—Edwin D. Schindler

[57]   ABSTRACT

A cultivator for the selective cultivation of limited ground areas, which includes a body adapted to be mounted on a prime mover, so that the body is able to be selectively brought into contact with the ground surface to be cultivated. A rotatable shaft extends outwardly from the body, with the work head being mounted on the rotatable shaft for permitting rotation thereof, and the shaft being driven by a motor. A pair of tines is connected to the work head and extends downwardly from the work head, with the pair of tines being diametrically spaced relative to the rotatable shaft and extending downwardly and inwardly, and being offset from each other so that, upon downward movement into the ground surface, the pair of tines form a conical area of disturbed soil, with the wall of the conical area of disturbed soil being worked differently by each tine of the pair of tines, so that as each tines passes over a part of a side of the cultivated area of the ground surface, the contact with the cultivated area by each tine will differ from the contact of the other tine of the pair of tines, with a substantially conical cultivated volume, having walls which are unglazed, being formed.

8 Claims, 2 Drawing Sheets

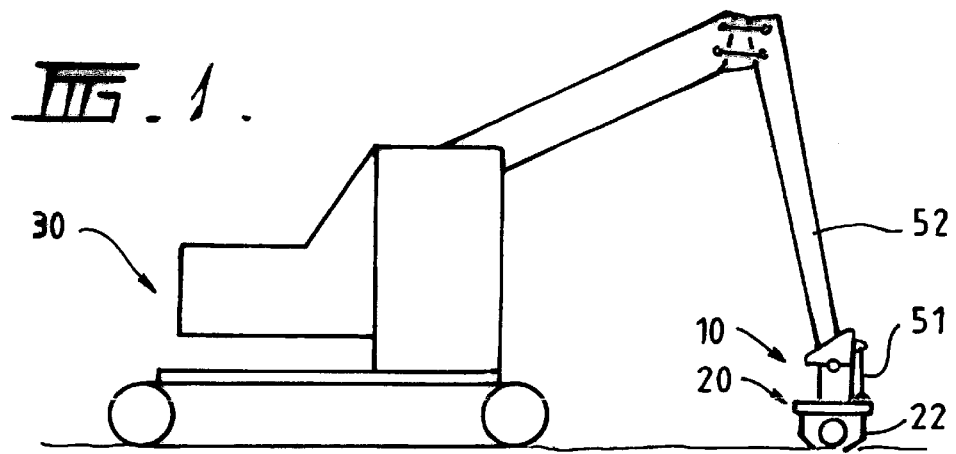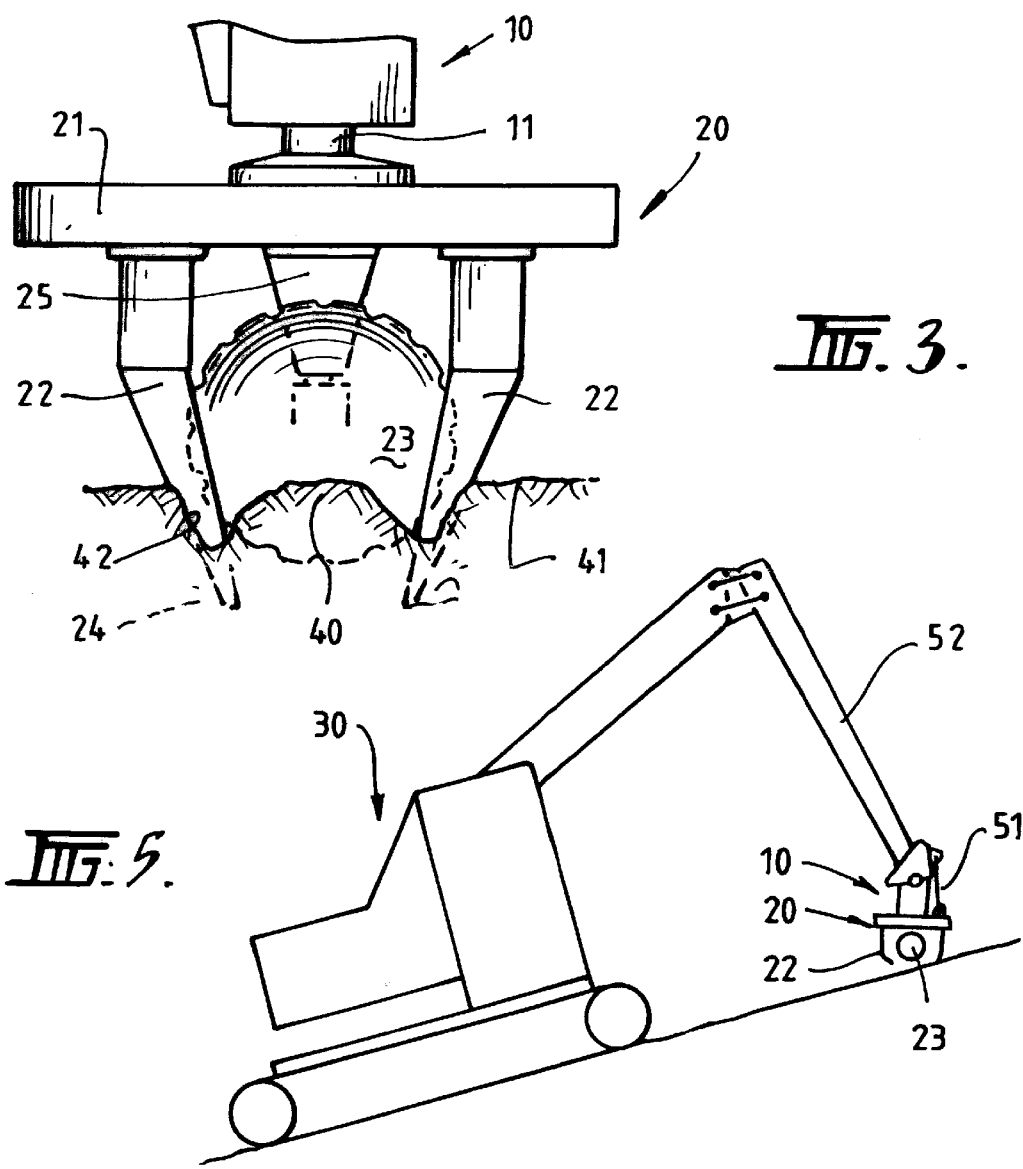

CULTIVATOR

This invention is directed to a cultivator and particularly to a cultivator which is useful in reafforestation but can also be used in other applications where selective cultivation in required.

Conventionally, when replanting is being effected to establish reafforestation, the surface is normally worked in rows with a cultivator in the form of a disc cultivator or a ripper which disturb the ground surface along the length of the row. The seedlings are then located at required positions along this cultivated row.

This form of cultivation disturbs some 50% of the soil's surface and thus leaves the area open for wind or water erosion before the regrowth of ground cover ad the new tree seedlings have acted to bind the surface and recovered it.

It is an object of the present invention to provide a cultivator which enables reafforestation to occur with a disturbance of substantially less of the surface, of the order of 20%, thereby maximising the undisturbed land and, at the same time, minimising any overall disturbance of the surface and thus erosion.

The invention includes a cultivator having a body adapted to be mounted on a prime mover so that it can selectively be brought into contact with the ground, a rotatable shaft extending outwardly from the body and having connected thereto a tool head and tools thereon and adapted to work the ground surface.

It may be preferred that the cultivator is connected to the jib or boom of a prime mover The tools may be preferably disposed symmetrically relative to the axis of the shaft but, if required, they can be asymmetric.

In a preferred form of the invention, the tools to work the grounds surface include a pair of tines or culters (cultivators) which are located at an angle to the vertical and which enter the ground whilst being rotated, to thereby cause disturbance of tile soil which breaks up the soil but which does not provide a glazed surface at the perimeter of the broken up area.

We may also prefer to provide a pair of discs which can be so located that when they move the soil which has been disturbed by the tines, they tend to form this into a mound.

In another aspect of the invention, the axis of rotation of the shaft may be moved so that the tool can be used to provide cultivated portion which is at a required angle to the side of a slope, notwithstanding the position of the prime mover.

In order that the invention may be more readily understood, we shall describe, in relation to the accompanying drawings, certain embodiments of the invention.

In these drawings:

FIG. 1 is a perspective view of the apparatus of the invention connected to a tracked excavator;

FIG. 3 is a sectional view, with the tools of the apparatus at their maximum depth;

FIG. 5 is a view of the apparatus when located to enter a slope at an angle to the body of the prime mover.

Figure 2:
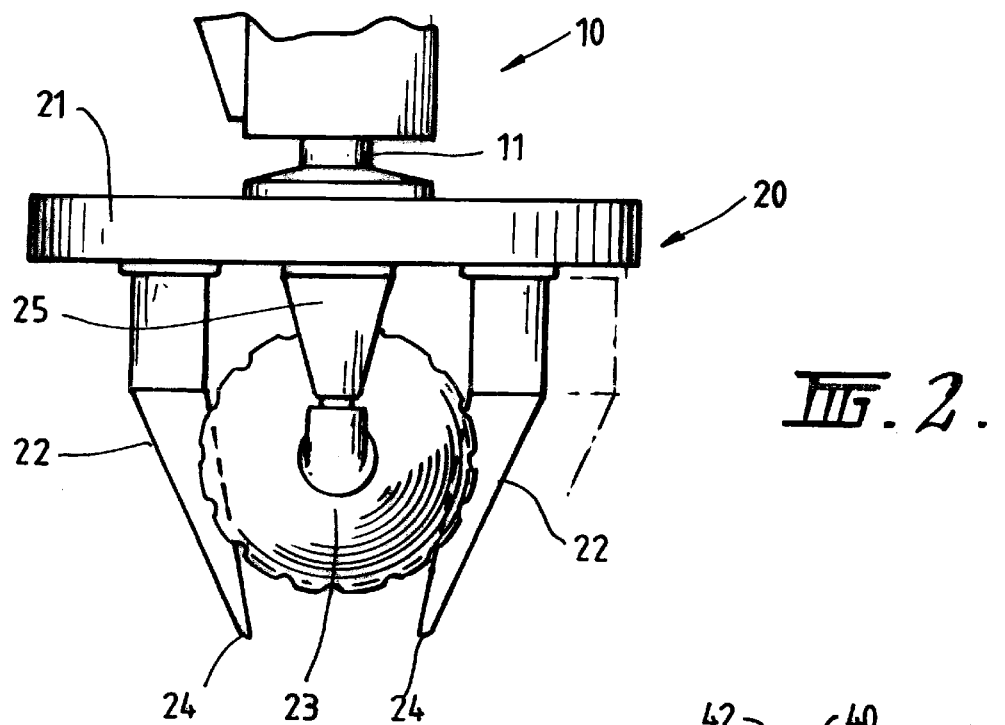
FIG. 2 is a view of the apparatus when about to contact ground surface.

Before referring specifically to he drawing, we shall make certain general comments about the apparatus.

The main aspect of each of the forms of the apparatus is that there, is a rotatable work head 20 having tool receiving members thereon associated with a body 10 and the body is preferably associated with a prime mover and power source 30. Depending on the application, this could be a heavy cultivator, such as those known as Traxtivators, it could be a tractor, either heavy or light, or it could be a four-wheel drive vehicle with a power take off or a source of hydraulic fluid.

It will be appreciated that for reafforestation in native forests or rain forests, the apparatus will need to be heavy with substantial power whereas for an application such as planting trees on cleared land, a very much lighter apparatus can be used.

Also, the size of the device can depend on the application For example, a machine suitable for Australian forests could be too large for use in a Malaysian oil tree operation.

Also, the form of drive selected can depend on application and circumstance. Normally drive by an hydraulic motor would be preferred, and is effectively essential in heavy applications, but in other applications, the drive could be, for example, a mechanical drive. The apparatus could carry a motor either for direct driving or to provide a source of hydraulic fluid under pressure.

The device of the invention could even be applied to a hand held boring machine.

For ease of description we will assume that the cultivator is being used for reafforestation and is connected to a excavator 30 but, where necessary, it is to be under stood that this is used in a generic sense.

The cultivator basically has a work head 20 which is mounted on a shaft 11 which, in turn, is mounted for axial rotation in the body 10.

In the preferred form of the invention, the shaft 11 may be directly connected to a hydraulic motor which is driven from the prime mover 30.

In another form of the invention, not illustrated, the shaft can be rotated by a chain drive with a spur gear on the shaft being connected to a spur gear on a motor which may be spaced therefrom and which in turn can be a hydraulic motor driven from the prime mover. in this case, if required, at ratios between the speed of the motor and the speed of the shaft can he varied by putting different size spur gears on the two shafts.

The tool carrier 21 can preferably be in the form of a plate which has means whereby tools can be connected thereto or, alternatively, could be of cruciform.

In the preferred form of cultivator, we use a pair of tines 22 and a pair of discs 23 with the tines 22 being opposed on one axis and the discs 23 being diametrically opposed on another axis at right angles thereto.

The tines 22 extend downwardly and inwardly and are preferably displaced from the axis, and their lower ends 24 terminate so that there is a spacing between the two both in the direction of the diameter and at right angles to this.

The arrangement is such that if the tines alone were placed onto the grounds surface with the work head 20 rotating, and downward pressure was applied thereto, they would form a basically conical cultivated area with the width of this, at the ground surface, being equivalent to the spacing between the tines at their maximum depth into the ground. Because the tines are off-set, the sides of the cultivated area do not become smooth and glazed but rather are roughened or ridged.

This is most important as, when the tree planted into the cultivated portion grows, and its root mass extends to the side wall, it is most desirable that it be able to pass through the side wall into the adjacent, uncultivated, area of soil. If it does not, or cannot, do this, the root mass will tend to stay in the cultivated area, the tree will become root bound and it will have little stability and limited growth.

The tines 22 can be adjustably mounted on the rotating member both as far as the angle of insertion is concerned and the maximum depth of insertion so, if required, these can be varied for different applications.

Further, the characteristics of the tines may vary depending on the application. For example, if the cultivator is to be used in hard, stony, soil, then the tines should be strong and may have substantial width. If, on the other hand, the cultivator is to be used in wet clay, or the like, the tines will be thinner to limit the build up of clay thereon.

The discs 23, which are mounted diametrically and are equally angularly between the two tines. The discs are rotatably mounted on a carrier 25 which is connected to the plate 21 and extend over the convex outer surface of the disk. The disks are rotated by their contact with the ground and it may be preferred that the outer periphery of the disks be scalloped to ensure good frictional contact with the ground.

Figure 4:
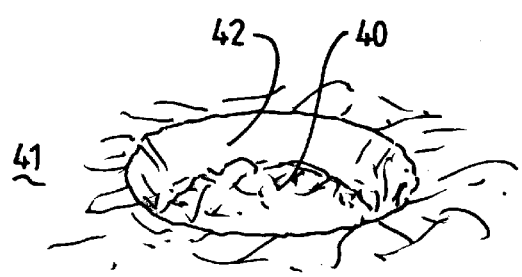
FIG. 4 is a view of the ground surface after cultivation.
Figure 6:
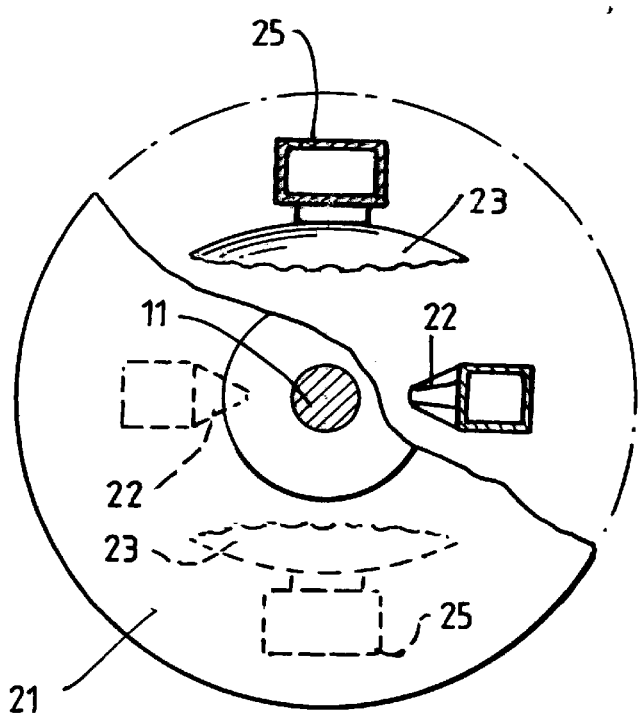
FIG. 6 is a view of the tines and disks of the apparatus.

The discs 23 are adapted to move the material which is loosened by the tines, to form this into a mound over the upper surface of the cultivated area. This can be seen in FIG. 4. The upper surface 40 can be slightly above normal ground level 41, because of the increased volume occupied by the cultivated soil, as against the volume occupied by the compressed soil. It is preferred that there be a lowered channel 42 around the external surface of the mound to act to receive water run-off therefrom and to permit this water to pass down into the cultivated area to be available to the tree planted therein.

In operation, the work head 21 is brought into the required position, the shaft 11 is rotated and the work head is moved downwardly under pressure. The ends 24 of the tines 22 commence to dig a substantially conical hole which becomes wider as the tines are further passed into the ground.

After a certain part of the downward movement, the discs 23 then strike the ground adjacent the edge of the area cultivated by the tines and rotate in the ground being driven by ground contact. The discs tend to lift and carry the soil from the ground inwardly so that it tends to build up as a mound 40 in the central portion while the discs leave a lowered channel 42 around the outer portion. Whilst this movement occurs, it is appreciated that there is little overall movement of the soil, it is not "turned over", but simply cultivated with a movement of a small part to the centre of the cultivated area.

When the cultivator is removed from the ground, there is thus provided a cultivated portion which presents a relatively circular upper surface surrounded by a trench or the like. The size and depth of this area can vary depending on the size of the cultivator and the location and types of tines. It is possible to cultivate an area to the depth of approximately 1 metre with a large cultivator.

It is possible to then plant a seedling in the centre of the cultivated area. As mentioned, the channel 42 or surround will aid in assisting the maintenance of water by providing a dam either when the seedling is initially watered or subsequently when the area is the subject of rainfall.

Also, because of the way in which the area has been worked, most of the ground cover will still be on the top of the cultivated area and this will re-establish rapidly.

The seedling can readily grow with its root system extending out into the cultivated portion. When these roots require to extend outwardly further, the side walls of the cone are not smooth and, as such, it is quite possible for the roots readily to break through this side wall into the soil adjacent thereto.

If required, the central shaft of the device could be made hollow and desired materials such as fertilizers, herbicides or pesticides could be delivered during or after cultivation through the hollow shaft.

The shaft could be provided with a magazine carrying seedlings to be planted, and when the depth of cultivation is as required, the seedling could be carried downwardly and planted, possibly by means of the use of a hollow shaft or the like which can cause the seedling to be located within the ground prior to the tines and discs being removed from the ground and re-used. This may not be fully useful in all applications as areas could be cultivated over a period of time before re-planting is to take place as the preparation of a large area may take substantial time and there is also a desirable time for planting of seedlings.

The cultivator of the invention can also, as illustrated in FIG. 5, readily be used on steeply sloping areas to provide a satisfactory cultivation.

Normally, on such areas, the tracks or wheels of the prime mover will normally be at an angle to the horizontal, because of the slope, and it may be desirable to effect the cultivation so that the cultivated area is still effectively vertical or at some angle to the vertical, depending upon the degree of slope.

The device of the invention can be provided so that the body 10, and thus the rotating shaft can be located at any required angle to the boom to which it is attached. That is, at any required angle relative to the ground surface, and its operation will not differ in any way from that as previously described, where a flat ground surface was assumed.

This adjustment can be by a ram 51 located between the jib 52 and a point of pivoted connection of the body 10 whereby the body can be rotated.

We have found, using the cultivator of the invention, that we can provide of the order of 1,300 cultivated areas per hectare, and thus 1,300 seedlings in this area, without any apparent great disturbance of the overall surface and in such a way that there is no substantial tendency towards erosion.

In fact, erosion is resisted because of the form of the cultivated area.

For example, if there should be heavy precipitation or water run off, this will tend to collect in the surround to each cultivated area and thus not only ensure good irrigation of the root systems of the seedlings, but restrict the overall flow of water.

Whilst we have described the invention as having two tines and two discs, it will be appreciated that depending upon the sine of the area which is required to be cultivated so we could have more discs or tines although it is preferable that these be arranged so that they are symmetrically located about the periphery so that un-symmetric loads on the motor are restricted.

Also, as mentioned above, depending on the application, the actual form of tines can vary. For example, if the apparatus is being used in wet ground, the tines could be thinner and resist build up of soil thereon whereas in dry ground, an)d particularly difficult, such as rocky ground, the tines could be physically larger and stronger.

We claim:

1. A cultivator for selective cultivation of limited ground areas, comprising:

a body adapted to be mounted on a prime mover, so that said body is capable of being selectively brought into contact with a ground surface to be cultivated;

a rotatable shaft extending outwardly from said body;

a work head mounted on said rotatable shaft for permitting rotation thereof;

drive means being connected to said rotatable shaft, said drive means providing rotary motion transmittable to said work head;

a pair of tines connected to said work head and extending downwardly from said work head, said pair of tines being diametrically spaced relative to said rotatable shaft and extending downwardly and inwardly and being offset from each other so that, upon downward movement into the ground surface, said pair of tines form a conical area of disturbed soil, with a wall of the conical area of disturbed soil being worked differently by each tine of said pair of tines, so that as each said tine passes over a part of a side of a cultivated area of the ground surface, there is contact which differs from that contact of the other said tine of said pair of tines, whereby there is formed a siubstantially conical cultivated volume having walls which are unglazed.

2. The cultivator according to claim 1, further comprising a pair of discs connected to said work head, said pair of discs being arranged relative to said pair of tines so that, as said work head is removed from the cultivated area, said pair of discs pick-up a portion of the disturbed soil.

3. The cultivator according to claim 2, wherein said pair of discs provide a peripheral recess about the cultivated area.

4. The cultivator according to claim 2, wherein said pair of discs is rotatable mounted to said work head and are able to be driven by around contact.

5. The cultivator according to claim 2, wherein each of said pair of discs has a periphery which is scalloped.

6. The cultivator according to claim 1, wherein lower ends of said pair of tines are arranged so that said pair of tines breaks tip the ground surface forming a broken-up area, but does not provide a glazed surface at a perimeter of the broken-up area of the ground surface.

7. The cultivator according to claim 6, wherein the lower end of said pair of tines are arranged so that a periphery of the broken-up area has a rough edge.

8. The cultivator according to claim 1, where an angle of, and depth of, said pair of tines is variable.

* * * * *